US008851738B2

(12) United States Patent
Kent

(10) Patent No.: US 8,851,738 B2
(45) Date of Patent: Oct. 7, 2014

(54) DOUGH BLENDER WITH SCRAPER

(75) Inventor: Joseph Kent, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 482 days.

(21) Appl. No.: 13/242,959

(22) Filed: Sep. 23, 2011

(65) Prior Publication Data

US 2012/0074252 A1   Mar. 29, 2012

Related U.S. Application Data

(60) Provisional application No. 61/385,672, filed on Sep. 23, 2010.

(51) Int. Cl.
    *A47J 43/10*     (2006.01)
    *A47J 43/28*     (2006.01)

(52) U.S. Cl.
    CPC ..................................... *A47J 43/28* (2013.01)
    USPC ........................................ 366/129; 241/169.2

(58) Field of Classification Search
    CPC ... A47J 43/1087; A47J 43/1093; A47J 43/28; A47J 43/288
    USPC ...... 366/129, 342, 343; 416/69, 70 R, 227 R, 416/231 A, 228; 99/348; 15/141.1, 141.2; 241/169.2; 30/117, 305
    See application file for complete search history.

(56) References Cited

U.S. PATENT DOCUMENTS

| 40,764 | A | * | 12/1863 | Maydole | 416/72 |
|---|---|---|---|---|---|
| 1,486,255 | A | * | 3/1924 | Lambert | 241/169.2 |
| 1,645,062 | A | * | 10/1927 | Lambert | 366/129 |
| 1,651,276 | A | * | 11/1927 | Hood | 241/301 |
| 1,724,356 | A | * | 8/1929 | Lambert | 366/129 |
| 1,735,236 | A | * | 11/1929 | Dennis | 366/129 |
| 1,859,958 | A | * | 5/1932 | Cessna, Jr. | 366/129 |
| 1,895,833 | A | * | 1/1933 | Baker | 241/301 |
| 1,902,525 | A | * | 3/1933 | Rowley | 366/129 |
| 1,910,229 | A | * | 5/1933 | Baker | 241/169.2 |
| 1,919,006 | A | * | 7/1933 | Bricker | 30/315 |
| 2,091,754 | A | * | 8/1937 | Fedje | 366/129 |
| 2,291,891 | A | * | 8/1942 | Glymph | 366/1 |
| 2,357,886 | A | * | 9/1944 | Gamache | 366/129 |
| 2,474,937 | A | * | 7/1949 | Feeley et al. | 404/133.1 |
| 2,559,186 | A | * | 7/1951 | Caylor | 241/169.2 |
| 2,573,550 | A | * | 10/1951 | Dennis | 416/70 R |
| 2,697,590 | A | * | 12/1954 | Brown | 366/129 |
| 2,714,909 | A | * | 8/1955 | Bryn | 241/166 |
| 2,732,188 | A | * | 1/1956 | Brown | 366/129 |
| 3,504,391 | A | * | 4/1970 | McCarty | 15/236.07 |
| 3,865,317 | A | * | 2/1975 | Brehm | 241/169.2 |
| 7,007,876 | B2 | * | 3/2006 | Galante et al. | 241/169.2 |
| 7,455,253 | B2 | * | 11/2008 | Dickie | 241/169.2 |
| 7,748,889 | B2 | * | 7/2010 | Fung | 366/129 |
| 8,307,491 | B1 | * | 11/2012 | Michel | 15/210.1 |
| 2004/0188555 | A1 | * | 9/2004 | Galante et al. | 241/169.2 |
| 2006/0113413 | A1 | * | 6/2006 | Dickie | 241/169.2 |
| 2007/0221772 | A1 | * | 9/2007 | Fung | 241/169.2 |
| 2009/0059715 | A1 | * | 3/2009 | Vendl et al. | 366/129 |
| 2012/0074252 | A1 | * | 3/2012 | Kent | 241/168 |
| 2013/0068250 | A1 | * | 3/2013 | Michel | 134/6 |

* cited by examiner

*Primary Examiner* — Charles Cooley
(74) *Attorney, Agent, or Firm* — Lowe Graham Jones PLLC

(57) ABSTRACT

A dough blender includes a handle and a plurality of tines. The tines may be in the form of thin plates having channels between them. A scraper is provided on the tines, attached to the blender to be moved across the tines to scrape food particles from the channels between the tines.

19 Claims, 6 Drawing Sheets

DOUGH BLENDER WITH SCRAPER

PRIORITY CLAIM

This application claims the benefit of prior provisional application Ser. No. 61/385,672 filed Sep. 23, 2010, the contents of which are incorporated by reference.

FIELD OF THE INVENTION

This invention relates generally to kitchen tools, particularly including tools for blending and mixing dough.

BACKGROUND OF THE INVENTION

Dough blenders for mixing pie crust, pastry dough, and the like, are commonly formed in a configuration in which a plurality of wires or tines are connected to a handle. The wires cut through the dough in order to blend it together. Unfortunately, the tines can quickly become clogged as the dough sticks to them. Mixing can become quite difficult, requiring the user to stop periodically to clean the tines. Current products, however, are very difficult to clean. They commonly require a user's hand or a fork, knife, or other utensil to scrape the tines individually. The process can be slow and ineffective, making the mixing process more time consuming and difficult.

SUMMARY OF THE INVENTION

A preferred dough blender includes a handle and a plurality of tines. In the illustrated example, the tines are in the form of thin plates having channels between them. A scraper is provided on the tines, attached to the blender to be moved across the tines to scrape food particles from the channels between the tines.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
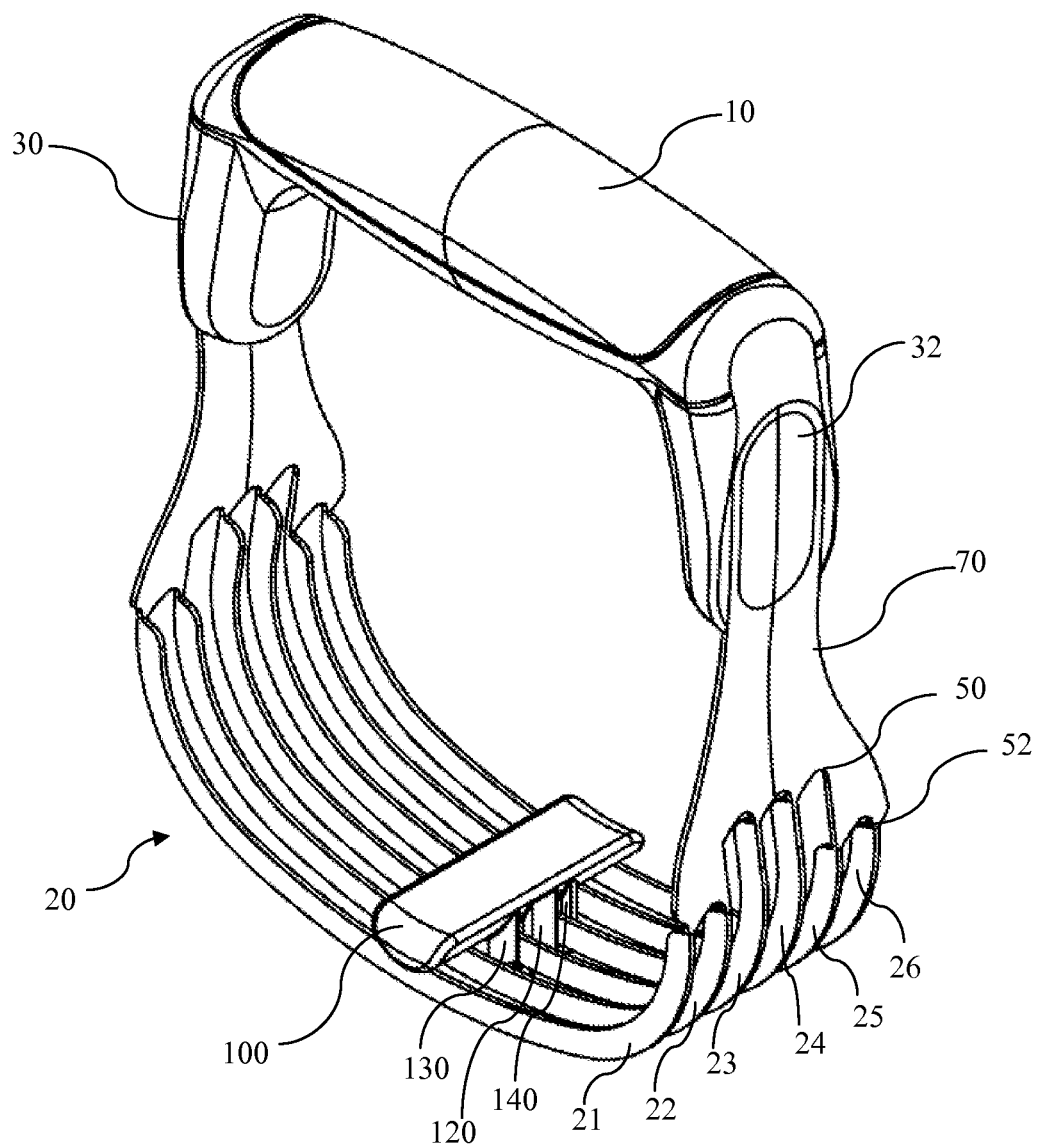
FIG. 1 is a top perspective view of a preferred dough blender.
Figure 2:
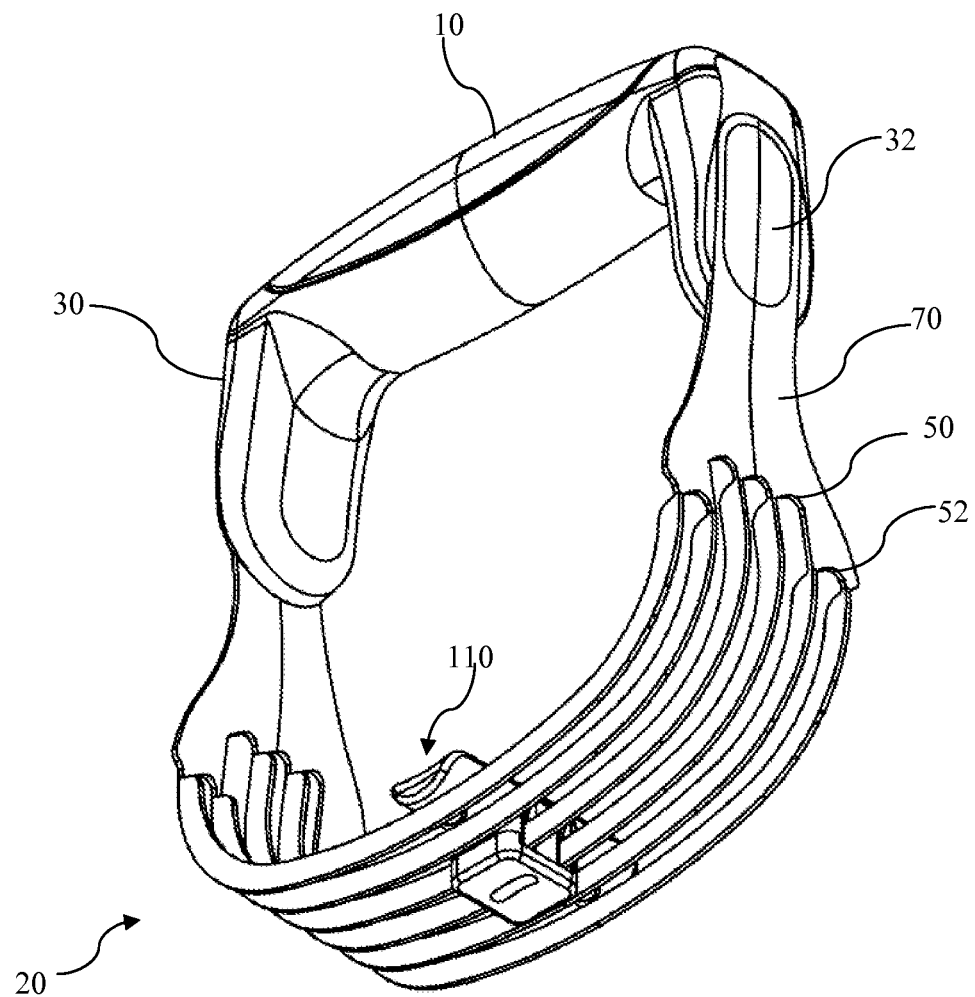
FIG. 2 is a bottom perspective view of a preferred dough blender.
Figure 4:
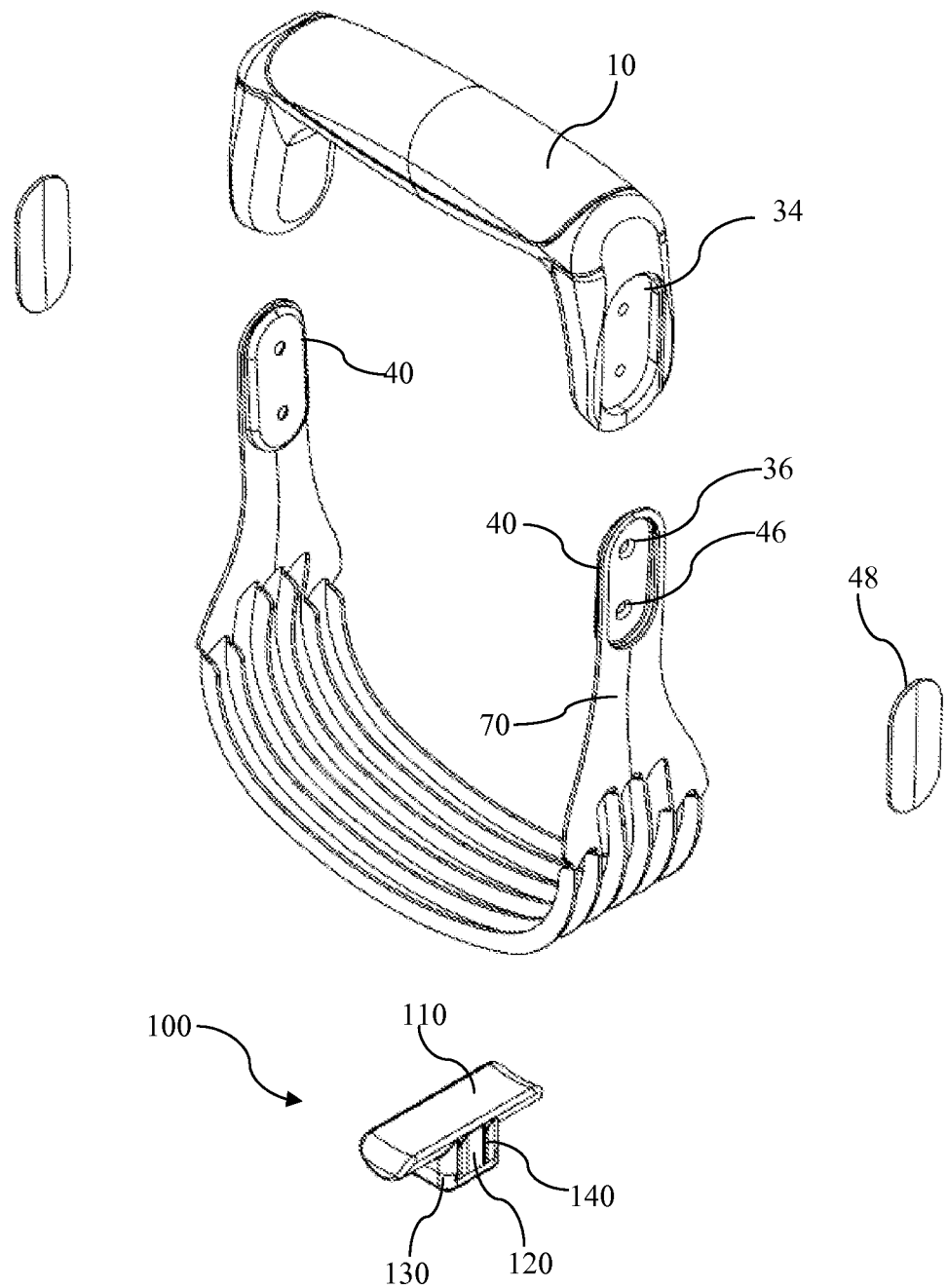
FIG. 4 is an exploded view of a preferred dough blender.
Figure 5:
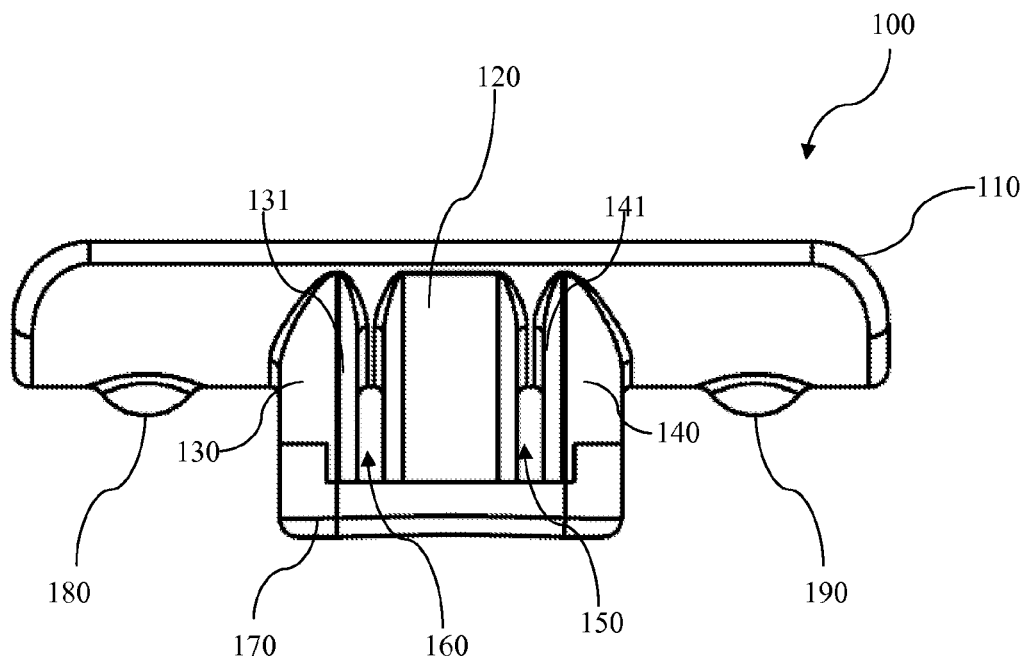
FIG. 5 is a front view of a scraper for use with a preferred dough blender.
Figure 6:
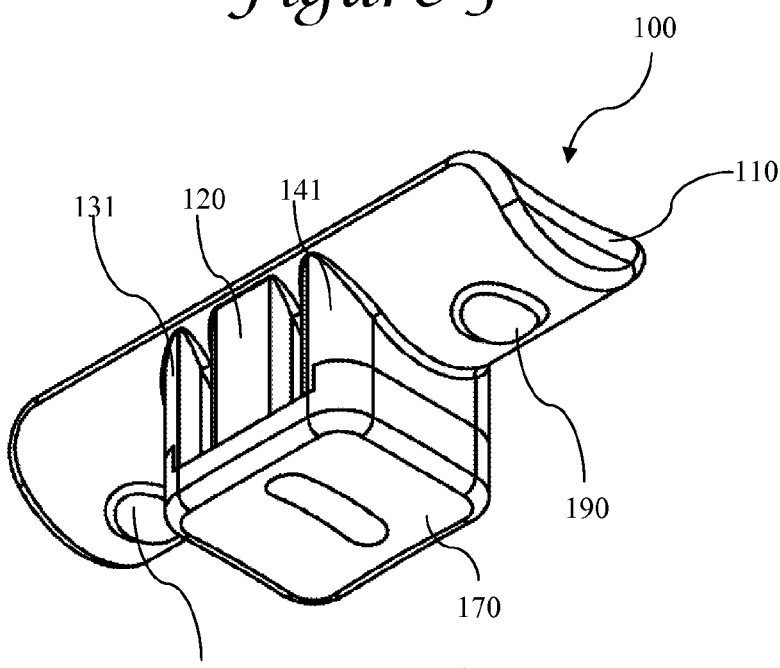
FIG. 6 is a perspective view of a scraper for use with a preferred dough blender.
Figure 7:
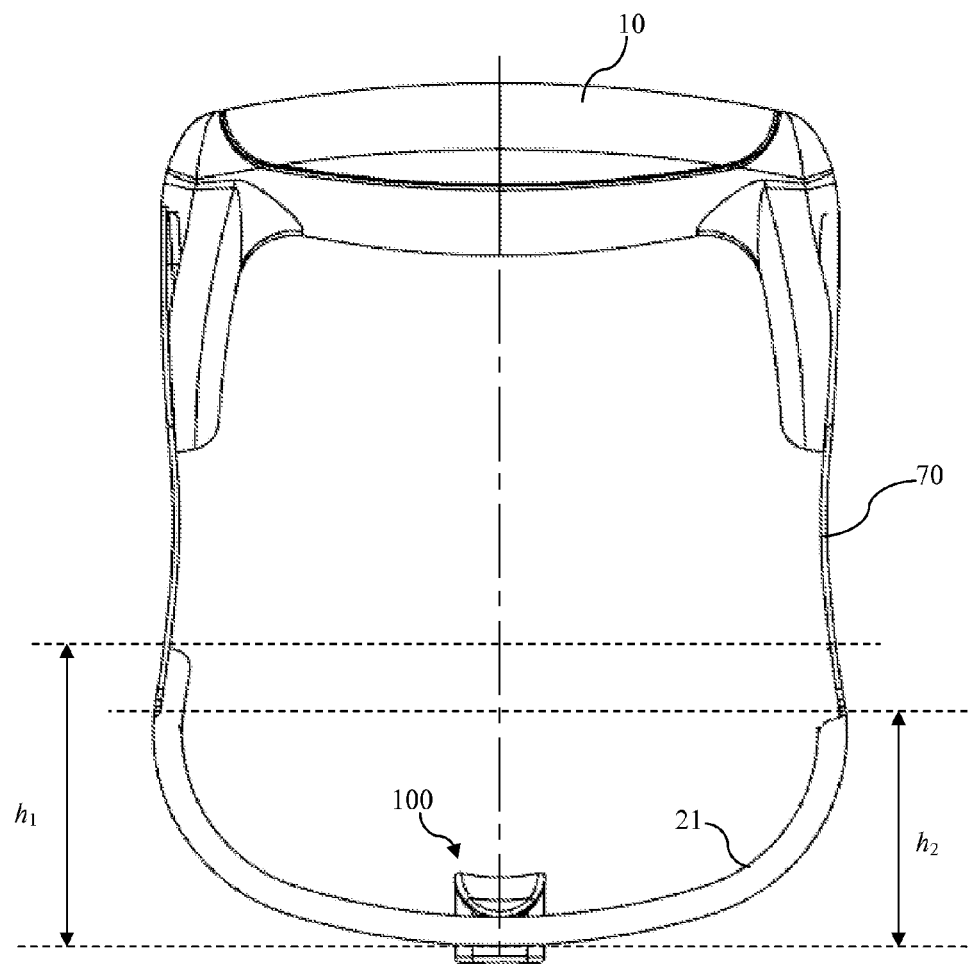
FIG. 7 is a front view of a preferred dough blender.

The preferred dough blender, or cutter, as illustrated in FIGS. 1 and 2 includes a handle 10 supporting a tine assembly 20 having a plurality of tines or blades. The handle includes a generally horizontal grip and a tine connector 30, 32 formed at each end of the grip. In the preferred example, the tine connectors extend downward at an angle of approximately 90 degrees with respect to the horizontal axis of the grip. Each of the tine connectors is formed with a trough 34 that is sized and configured to snugly receive a corresponding step 40 formed on the tine assembly 20 in order to join the tine assembly to the handle, s best seen in FIG. 4. Each end of the tine assembly and the tine connector further includes one or more bores 36, 46 for receiving a screw or other fastener to join the tine assembly to the grip. A cover plate 48 is press-fit, glued, sonic-welded, or otherwise secured over the fasteners to provide a generally smooth outer surface covering the fasteners. Although not shown in the figures, the cover plate 48 may be formed with pegs or teeth that mate with corresponding surfaces on the tine assembly.

It should be appreciated that the tine assembly may be joined to the handle in other means, such as by gluing, press-fitting, sonic welding, or other fashions. Likewise, the trough and step may be reversed to place the trough on the tine assembly and the step on the handle. In still other versions, the ends of the tine assembly may slide into slots formed in the tine connectors.

Figure 3:
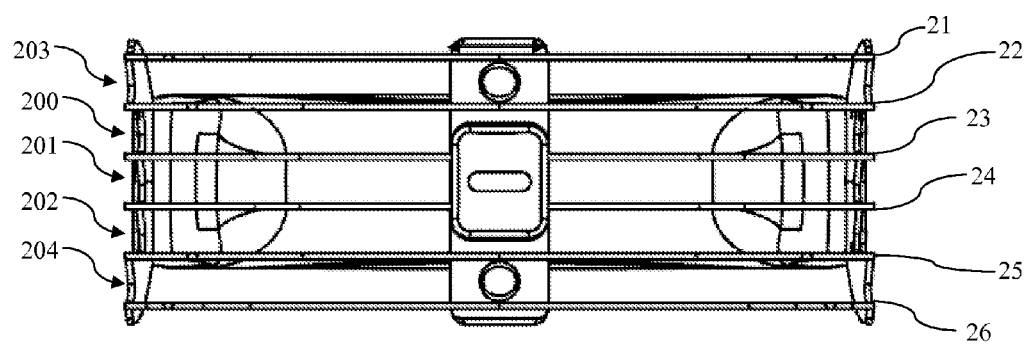
FIG. 3 is a bottom view of a preferred dough blender.

As best seen in FIG. 3, the tine assembly 20 includes a plurality of tines or blades. In the preferred example, the tine assembly includes six tines 21-26 formed adjacent to and parallel to one another. The six tines include two center tines 23, 24 surrounded by two pairs of outer tines, 21, 22 and 25, 26. The tines of the preferred version are preferably formed as blades in that each of the tines has a cross-sectional shape having a height that is much larger than its width. Most preferably, the height is at least five times greater than the width, and in some versions the height may be ten times or more greater than the width. This form of construction of the tines in the shape of blades rather than circular wires allows for the tines to have an improved rigidity and strength to cut through tougher dough, and provides an improvement over prior art devices that provide wires as tines.

At each end, the tines terminate in a plate 70 that is substantially flat and tapers toward a distal end that forms the step or other connection surface to mate with the handle. The plate 70 is generally orthogonal to the plane forming the height of the blade-shaped tines, thereby providing structural rigidity for the tines as they are used to mix dough. In one version of the invention, the tines are formed from stainless steel and are integrally formed with the plate 70 forming either end of the tine assembly 20. In other versions, the tine assembly may be integrally formed from a plastic material.

A scraper 100 is attached to the tine assembly for sliding movement along one or more of the tines. In the version as illustrated, the scraper 100 includes a horizontal bar 110 configured to be wide enough to span the width of the blades 21-26. In other words, the bar 110 has a width that is somewhat greater than the distance from the first tine 21 to the last tine 26. The bar serves as a structural member to span the tines, and further provides a surface for grasping by the user.

The bar 110 of the scraper is secured to a plurality of fingers 120, 130, 140, including a first finger formed as a central stem 120 that is substantially perpendicular to the bar. The central stem is sized and configured to snugly fit between the central pair of tines 23, 24. A second finger 130 and third finger 140 are positioned on opposite sides of the central stem 120. A first sidewall 130 (formed on the second finger) and a second sidewall 140 (formed on the third finger) are secured to the bar and extend parallel to the central stem. Each of the sidewalls is positioned sufficiently closely to the central stem to form a pair of slots 150, 160 on either side of the central stem.

A cap 170 is secured to the scraper 100 opposite the bar 110, to provide a fully enclosed pair of slots 150, 160. Thus, the scraper is assembled in position by placing the central two tines 23, 24 within the slots 150, 160 and encapsulating the tines by securing the cap to the central stem and sidewalls. In a preferred version, the cap is glued to the central stem. The cap may alternatively be press-fit, sonic welded, or otherwise secured to the stem.

The bar 110 includes an upper side or surface facing away from the tines, and a lower side or surface facing adjacent the tines. The lower side includes a pair of dome-shaped projections 180, 190 extending away from the lower side of the bar. A first projection is positioned such that it extends between one of the outer pairs of tines 21, 22 and a second projection is positioned such that it extends between the second of the outer pairs of tines 25, 26.

In use, the scraper 100 is slideable along the length of the tines. Because the central pair of tines 23, 24 is received between the slots 150, 160, the slots and corresponding central stem and sidewalls serve to scrap any dough off of the tines as the scraper is moved along the tines. Similarly, the projections 180, 190 scrape additional dough away from the space between the outer pairs of tines.

In an alternate embodiment, the scraper includes additional pairs of sidewalls to form a sufficient number of slots to encapsulate each of the tines 21-26. In such an embodiment, each of the tines is scraped by a surface on each side of the tine as the scraper moves along the length of the tines.

In one version of the invention, the central pair of tines 23, 24 are preferably longer than either of the outer pairs of tines. Accordingly, the central pairs of tines form channels 200, 201, 202 that are somewhat longer than the outermost channels 203, 204 that are formed between each of the outer pairs of tines. As shown in FIG. 1, the central channels terminate in a first edge 52 that is relatively closer to the grip than a second edge 50 at which the outer channels terminate. Most preferably, the central channels are longer than the outermost channels by a length that is approximately equal to the width w of the scraper. Because the central channels are longer, they provide a storage location for the scraper when not in use scraping the tines. Thus, the scraper can be snugly received within the central channels adjacent the plate 70, out of the way of the tines when used to mix dough or other food items.

In an alternate version of the invention, the tines on opposite sides of the dough blender are offset such that the ends of the tines on a first side extend to a point relatively closer to the handle than the ends of the tines on a second side. Thus, in the example shown, the tines on a first side terminate at a height h1 while the tines on a second side terminate at a height h2, with the height h1 being closer to the handle than the height h2. Most preferably in such an embodiment all six tines terminate at substantially the same height h1 at a first side and all six tines terminate at substantially the same height h2 at the second side.

In one version of the invention the width of the channels 200, 201, 202 are substantially uniform across their length. In alternate versions, the channel widths of one or more of these channels tapers somewhat adjacent the plate 70 in order to more snugly retain the scraper in a stowed position adjacent the plate.

In use, the dough blender is used to mix or cut flour mixtures such as for pastries, pie crusts and the like. The process of mixing the dough with the dough blender naturally forces the dough mixture between the tines. Because such dough mixtures commonly include shortening, butter or other such components, the dough can become lodged between the tines, hindering the ability of the dough blender to mix the dough thoroughly. In such a case, the scraper is moved through the channels and from one side of the blade plate to the other. As the scraper passes along the channels it scrapes dough from the tines, clearing them for improved mixing. This process of moving the scraper from one side to the other is repeated as many times as may be necessary during the course if mixing, improving the efficiency of the blender and the ability to mix the dough. When completed, the scraper can again be moved across the tines to facilitate easier cleanup.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A dough blender, comprising:
   a handle;
   a plurality of tines attached to the handle, the plurality of tines forming a plurality of channels between the tines; and
   a scraper slideably attached to the blender, the scraper having a plurality of fingers extending into at least some of the plurality of channels formed between the tines, wherein the plurality of fingers are slideably moveable together with the scraper along a path defined by at least some of the plurality of tines.

2. The dough blender of claim 1, wherein the handle forms a first end and a second end, the tines form a first end and a second end, the first end of the tines being secured to the first end of the handle and the second end of the tines being secured to the second end of the handle, and further wherein the scraper and the fingers are slideably moveable along a path from the first end of the tines toward the second end of the tines.

3. The dough blender of claim 2, wherein the scraper is permanently attached to the blender.

4. The dough blender of claim 3, wherein the tines are each formed as blades having a height and a width, the height being greater than the width.

5. The dough blender of claim 4, wherein the tines each comprise an upper surface and the scraper comprises a bar, the bar being in contact with the upper surfaces of the tines.

6. The dough blender of claim 5, wherein one of the plurality of fingers of the scraper further comprises a stem extending perpendicular to the bar, the stem being positioned between at least one of the plurality of channels.

7. The dough blender of claim 6, wherein the plurality of channels comprises a central channel positioned in the middle of the plurality of channels, and further wherein the stem is positioned in the central channel.

8. The dough blender of claim 6, wherein the scraper further comprises a plurality of projections extending from the cap into a corresponding plurality of channels.

9. The dough blender of claim 6, wherein the channels adjacent the first end of the tines terminate at a first height and the channels adjacent the second end of the tines terminate at a second height, the first height being relatively closer to the handle than the second height.

10. The dough blender of claim 6, wherein a width between a pair of the plurality of tines adjacent either the first end or the second end of the tines is relatively closer together than a width between the pair of the plurality of tines at a central location, whereby the scraper is more snugly received between the pair of tines adjacent either the first end or the second end.

11. A dough blender, comprising:
    a handle having a first end and a second end;
    a plurality of tines having a first end and a second end, the first end of the plurality of tines being attached to the first end of the handle, the second end of the plurality of tines being attached to the second end of the handle, the plurality of tines forming a plurality of channels between the tines; and a scraper slideably attached to the dough blender for movement of the scraper along the plurality of tines, the scraper having a a bar and a stem extending perpendicular to the bar, the stem being positioned within one of the plurality of channels, whereby the stem is slideably moveable within the one of the plurality of channels when the scraper is slideably moved along a path extending between the first end and the second end of the plurality of tines.

12. The dough blender of claim 11, further comprising at least one central channel and at least a first and a second peripheral channel, the first and second peripheral channels being on opposite sides of the central channel, and further wherein the central channel is longer than each of the peripheral channels.

13. The dough blender of claim 12, wherein the tines are each formed as blades having a height and a width, the height being greater than the width.

14. The dough blender of claim 12, wherein the tines each comprise an upper surface, the bar being positioned adjacent the upper surfaces of the tines.

15. The dough blender of claim 14, wherein the scraper further comprises a cap positioned on the stem opposite the bar to affix the scraper to the tines.

16. The dough blender of claim 15, wherein the plurality of channels comprises a central channel positioned in the middle of the plurality of channels, and further wherein the stem is positioned in the central channel.

17. The dough blender of claim 16, wherein the scraper further comprises a plurality of projections extending from the cap into a corresponding plurality of channels.

18. The dough blender of claim 17, wherein a width between a pair of the plurality of tines adjacent either the first end or the second end of the tines is relatively closer together than a width between the pair of the plurality of tines at a central location, whereby the scraper is more snugly received between the pair of tines adjacent either the first end or the second end.

19. The dough blender of claim 11, further comprising a plurality of fingers extending from the bar, each of the plurality of fingers extending into a separate one of the plurality of channels.

* * * * *